Figure 3:
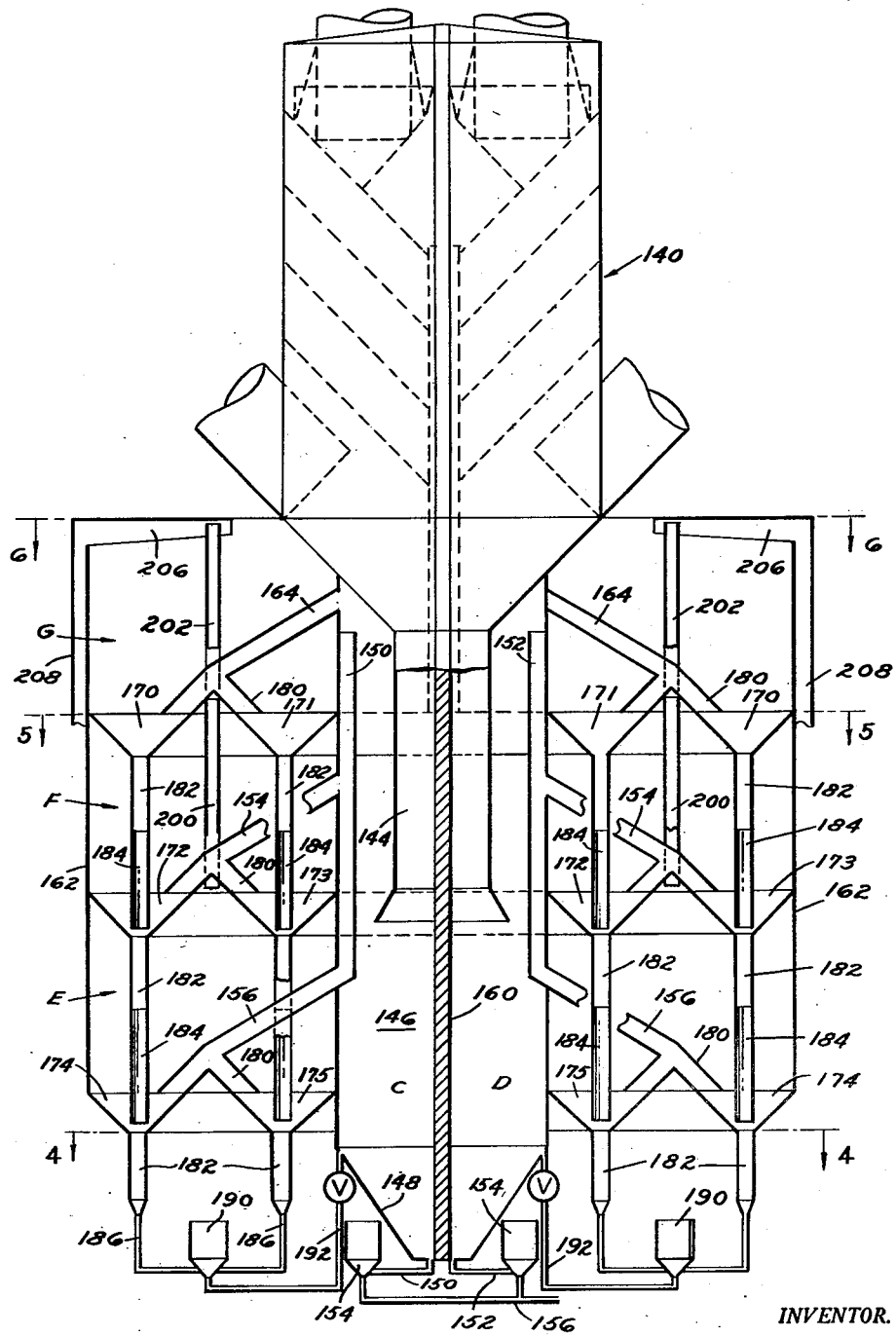

June 18, 1957 M. L. COVER 2,796,175
SETTLER FOR LIQUID-SUSPENDED PARTICLES
Filed Oct. 6, 1954 3 Sheets-Sheet 1
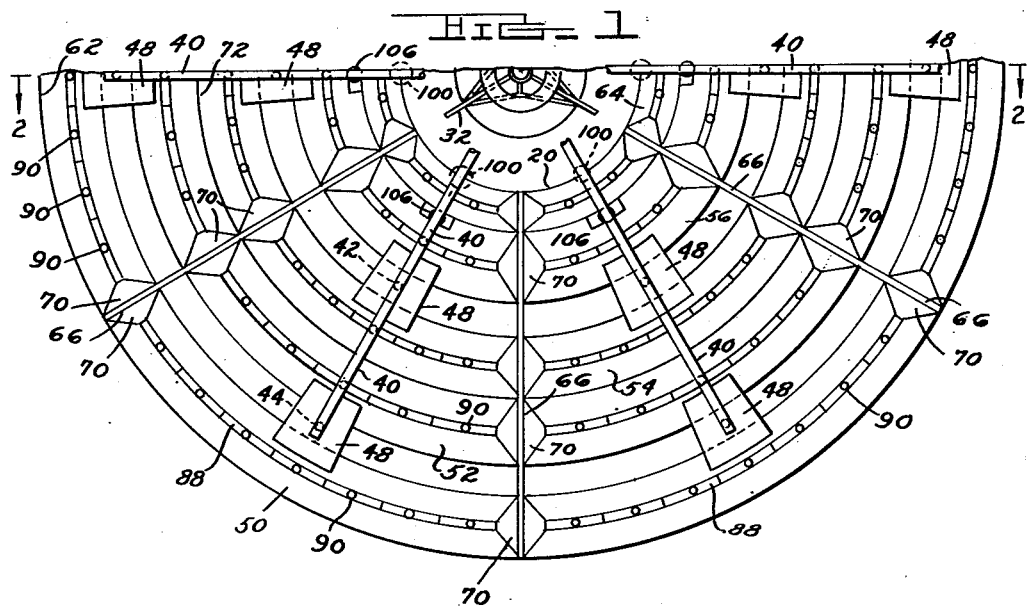
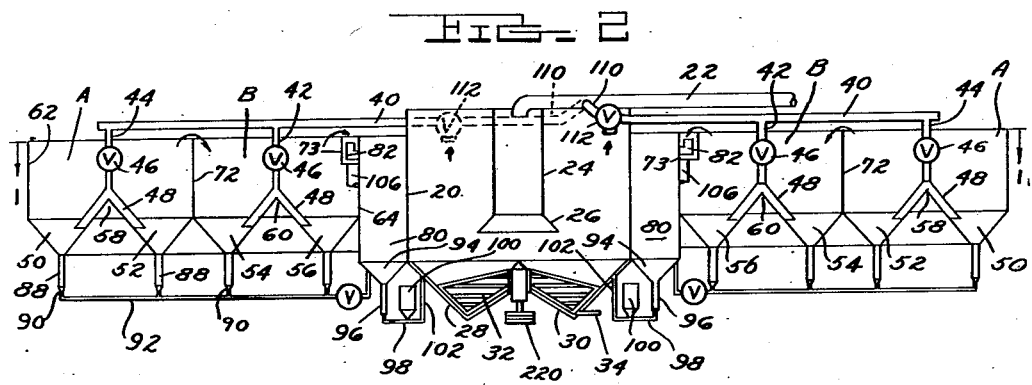
INVENTOR.
MARTIN L. COVER
BY
Barnes, Kisselle, Laughlin & Raisch
ATTORNEYS June 18, 1957  M. L. COVER  2,796,175
SETTLER FOR LIQUID-SUSPENDED PARTICLES
Filed Oct. 6, 1954  3 Sheets-Sheet 2

INVENTOR.
MARTIN L. COVER
BY
Barnes, Kisselle, Laughlin & Raisch
ATTORNEYS

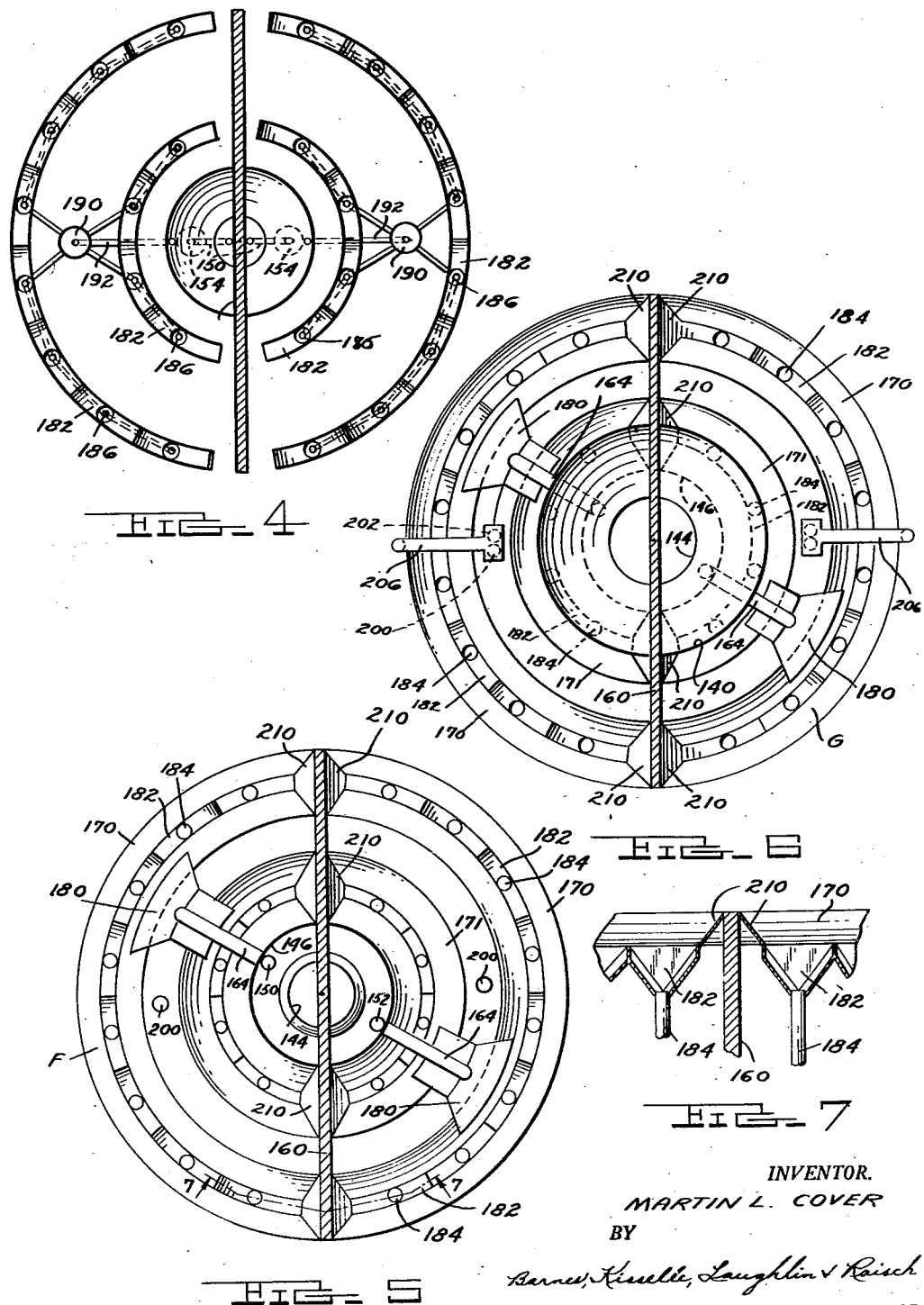

United States Patent Office 2,796,175
Patented June 18, 1957

2,796,175

SETTLER FOR LIQUID-SUSPENDED PARTICLES

Martin L. Cover, Churchville, N. Y.

Application October 6, 1954, Serial No. 460,575

8 Claims. (Cl. 210—73)

This invention relates to a settler for removing suspended particles from a fluid.

Oftentimes, in blast furnace operation, it is common to wash sand and dust particles from furnace gases to permit utilization in various accessory units and also to recover ore and coke dust which can be used in the blast furnace operation.

In the construction of settling devices, the limitations of time and space are critical. Only a certain amount of space in the nature of ground area and height are economically available, and it is important that the sediment be removed as quickly as possible from the liquid in order to keep a constant flow moving through the device.

Briefly, the present invention contemplates a combination of a main "sand" separator chamber together with a thickening and storage chamber or sludge accumulator and a plurality of smaller supplemental chambers which may settle the finer particles of the liquid simultaneously with the operation of the main chamber. This permits an overall decrease in settling time and avoids many of the problems that have been met with other settlers.

The present device is to be considered as an improvement on my settling device shown in Patent 2,539,992.

Drawings accompany the disclosure, and the various views thereof may be briefly described as:

Figure 1, a plan view of one embodiment of the device showing the relationship of the parts.

Figure 2, a diametrical section on line 2—2 of Figure 1.

Figure 3, a diametrical vertical section of a modified construction shown in combination with a gas washer unit.

Figure 4, a horizontal section on line 4—4 of Figure 3.

Figure 5, a horizontal section on line 5—5 of Figure 3.

Figure 6, a horizontal sectional view on line 6—6 of Figure 3 just below the top plate of the settling unit.

Figure 7, a sectional view taken on line 7—7 of Figure 5.

It is believed well to discuss generally the operation of this device before going into the details of construction of the units.

A main vertical chamber is first provided having a central inlet which opens to the chamber substantially well down in the chamber, usually one-half to three-fifths of the way down the overall height of the main separator chamber. The water from the washed gases or any other water containing particles in suspension which are to be separated from the liquid enters this main chamber at the end of the inlet tube, which usually is suspended centrally of the tank.

The larger particles will separate rather rapidly from the liquid, and it is estimated that from 70% to 90% of all solids are removed from the influent in this central tank. The affluent from this tank rises and overflows into other adjacent small tanks to be described. There, the smaller particles will separate out more slowly and move to the bottom, where they are then forced into the bottom of the large tank to mix with the heavier particles already separated, after which the mixture is removed and transferred to a thickener or storage unit.

Referring to the drawings, in Figures 1 and 2 there is shown a settling device which is relatively flat in its construction. The overall diameter might vary in commercial units from 20 feet to 150 feet, and the overall vertical dimension would be approximately 20 feet. In many installations, half of the construction could be under ground level and the other half above.

The large cylindrical tank 20 centrally of the unit can be referred to as the sand separator, thickener and storage tank. Fluid containing particles to be separated enters through a conduit 22 and is deposited or discharged into a main settler tube 24 having a flaring exit or end 26. This tube 24 extends downwardly approximately one-half to three-fifths of the overall height of the main chamber 20, preferably discharging below the center of the chamber at a point where specific gravity of the material entering the tank 20 is approximately the same as the material in the tank 20 at that level. The heavy particles, such as coarse sand, will move downwardly from the discharge end 26 to the bottom of the tank 20. About 70 percent of the solids will separate in this manner, moving constantly downward toward the bottom of the tank 20. At the bottom of the tank 20 is an inverted, conical wall 28 which joins with a second conical formation 30 forming a circular passage at the bottom, in which is located an agitator 32 which is operated by a suitable power unit to keep the particles in a state of suspension and prevent congealing. The outlet for the thickened material at the bottom of the tank 20 is shown at 34.

The finer particles of material which are discharging at 26 will not separate by gravity at this point but in a state of suspension will move upwardly to the top of tank 20, where it will overflow into tubes 40 which extend radially from the center tank 20. These radially disposed tubes 40 connect to vertical tubes 42 and 44 extending downwardly through regulating valves 46 to a flared-out section 48 which distributes the material from the main section 20 into a series of annular channels concentric with the device, each formed by intersecting conical surfaces, also concentric with the device. Thus, channels 50, 52, 54 and 56 are formed from the conical walls around the unit, channels 50 and 52 being separated by a conical ridge portion 58 and channels 54 and 56 being separated by conical ridge portions 60.

Above the channel sections is a vertical, cylindrical wall 62 which forms with a concentric wall 64 an annular chamber above the channels. The area between walls 62 and 64 is divided segmentally by radial wall portions 66 extending upwardly from the bottom of the troughs or channels to the same height as walls 62, 64 and 72. In each of the channels angled plate portions 70 are provided to prevent pocketing of material in the corners adjacent wall 66. Between concentric walls 62 and 64, another separator diaphragm 72 is provided concentric therewith to divide the outer portions of the unit into two concentric and separate settling chambers. The top of wall 72 is at such a level that overflow from tank A will be into tank B, and similarly overflow from tank B will be into a circular overflow run-way or launder 73.

Valves 46 are provided to control the amount of flow into the two separate concentric chambers so that the work or load of each unit can be controlled.

The outlet from the channels 50, 52, 54 and 56 is accomplished by gravity flow into a concentric tank 80 surrounding tank 20. The tank 80 has a variable overflow control unit 82, such as a telescoping pipe or similar device for maintaining the level in tank 80 slightly below the level in the adjoining concentric settling tanks. Material from the settling tanks, which might be referred to as A and B, Figure 2, flows out at the bottom through a plurality of hoppers 88, which terminate at the bottom in openings 90 leading to a pipe 92 extending radially inward and connecting to the bottom of the sludge accumulator 80. The bottom of the sludge accumulator 80 is formed in the shape of an annular channel section having conical walls at 94, and this channel section 94 discharges in the same manner through hoppers 96 to a tube 98 leading to an automatic pressure booster 100, which forces the material into the bottom of the tank 20 through pipes 102. These will charge directly to the filter when the thickener is being cleaned.

The automatic pressure unit 100 is described more fully in my co-pending application Serial No. 155,469, filed April 12, 1950, now abandoned. The affluent leaves the settler device through the overflow from tank 80, which discharges into a pipe 106 from each section of the unit.

The entire unit is so constructed that any particular radial section between walls 66 may be shut off by closing the valves 46 so that it may be cleaned out. Check valves would be provided in pipes 92 to prevent back flow. Pipes 40 leading to the outer settling tanks can be connected directly to in-flow pipe 22 through branch portions 110 in valves 112. With this arrangement, if it is necessary to close the central tank 20 for cleaning or repair, the in-flow can be directly to pipes 40 and the concentric settling tanks A and B. During this operation, the flow from pipes 98 at the bottom of the sludge tank 80 would be directly to the filter tank rather than through tank 20.

Actually, the tank 20 serves as a thickener tank primarily, although there is an initial separating which takes place in this tank of the heavier particles as they pass from the inlet 24 to the separator tanks A and B. The separator tanks A and B serve primarily as separation units for the fine material, due to the fact that the heavy material is separated in tank 20, so that the danger of clogging in the separator tanks is practically eliminated. After the separation in the tanks A and B, the material is returned to the sludge tank 80 and then transferred again to the thickener tank 20, where it is there made ready for the filter outlet 34. In the ordinary settling arrangement where only one tank is used, there is a distinct level below which the thickening occurs and above which separation occurs. In the separation process, the solids drop out of the carrying liquid as it rises in the settling tank. In the thickening zone the thickened material settles down and squeezes the water out of itself.

In Figures 3 to 6, a modified version of the device is shown utilizing a vertical relationship of the settling chambers around a central thickening chamber. The device is also shown associated with a dust washer of the type disclosed in my Patent No. 2,539,992, dated January 30, 1951. The device in Figure 3 is divided by a vertical wall into two sections to permit continuous operation if a portion of it must be closed down. The object of the vertical stacking of the units or the stacked tray arrangement is the reduction in the velocity of the affluent water, thus multiplying the settling capacity.

In Figure 3 a dust washer unit 140 is shown having a discharge pipe 144. This washer unit is of the type described in my above-identified patent. The pipe 144 discharges into the thickener tank 146, which has an inverted conical base 148 discharging in conduits 150 and 152 through automatic pressure build-up units 154 which force the material into a pipe 156. As in the previously described device, the heavy particles entering through pipe 144 will flow directly into the thickener portion of the tank 146, whereas the material that must be settled out will pass upwardly and overflow into tubes 150 and 152 on either side of tank 146, the tank being divided into sections C and D by a reinforced dividing wall 160.

Around the tank 146 are three settling units E, F and G stacked vertically in concentric relation to the tank and confined by an outer wall 162. Section G is fed through tubes or pipes 164 opening to the top of the tank 146. Sections E and F are fed through pipes 150 and 152, which branch into pressures boosters 154 and pipe 156. Each of the sections E, F and G have continuous channels 170 and 171 for section G; 172 and 173 for section F; and 174 and 175 for section E, these channels being fed by divider units 180 leading from the conduit pipes and each channel being served for an outlet by a series of circumferentially spaced hoppers 182 which terminate in down conduits 184, with the exception of the bottom group, which terminates in conduits 186 leading to an automatic transfer device 190, which moves material therefrom into the thickener 146 through conduits 192.

The overflow for the entire device is through pipes 200 for section E and pipes 202 for section F and directly into the launder unit 206 for section G, the overflow going down through pipes 208 on either side. Here, the conical channels 170 to 175 join with the divider panel 160. Angled panels 210 are provided to prevent trapping of materials in the corners; and below these panels, the conical walls of the various channels 170 to 175 are apertured at 215 to permit passage and thus avoiding trapping any liquid.

The operation of the construction shown in Figures 3 to 6 is substantially the same as that described in connection with Figures 1 and 2, it being understood that the main thickening action where the particles actually squeeze the suspending liquid upward and away from the mass takes place in tank 146 at the bottom. The actual settling action takes place in sections E, F and G, which are stacked and separated vertically to reduce the velocity of the liquid flowing therein and thus permit an even and steady settling operation there which reduces the time for a given quantity to pass through the unit. Final thickening during normal operation takes place again in the bottom of tank 146, after which the thickened sludge is passed to a filter unit.

The operation of the settling unit shown in Figures 2 and 3 is much the same, with the exception that in the embodiment shown in Figures 1 and 2 it is possible to close off the various segments between walls 66 so that the individual segments can be cleaned if desired and also if the capacity of the unit is to be cut down one or more segments may be cut out of operation for any length of time desired. This is accomplished simply by controlling the flow through the pipes 42 and 44 to the various segments by valves 46 or utilizing valve 112 as previously described. Apart from this difference, the basic concept of the two disclosed modifications is the idea of a central tank with individual cell units associated therewith either horizontally, as in Figure 2, or vertically, as in Figure 3.

The basic concept is the reduction of settling time in each particular cell so that the total gallons per minute that can be handled is materially increased. The clarity of the effluent sum of the blast furnace gas washer water depends upon the time of settling, the rising velocity of the water, the amount of disturbance, and the point at which the water enters the settling chamber.

In the present device it is desired to bring the effluent water close to the point of division of the settling and thickening zones of the various cells where the entering water spreads with comparatively little diffusion at a level just above the level where the two zones join. For a given settling time and condition, the effluent in this case will contain less grains per gallon (g. p. g.).

The rising velocity of the water is a function of the settling time and the height of the settling chamber and is independent of the diameter of the chamber. The rising velocity should be held to about 2 inches per minute. Disturbance from any sources, such as swirling water or moving sweeps, lowers the settling efficiency and should be avoided.

With the present construction, with an influent of 100 to 150 g. p. g., approximately 60% to 75% of the coarse material is settled out in the main tank, and effluent liquid from the main tank going to the various cells will contain under normal operation 25 to 60 g. p. g. By utilizing individual cells for the overflow from the main tank, each with a limited vertical dimension, the return of vertical flow can be kept down, that is, the rising velocity is reduced to a point where settling of the particles is at a maximum. In addition, in the small cells, it is possible, as illustrated in the drawings, to utilize the individual intersecting cones which focus the material to points where it can be transferred without clogging.

It will be noted that each particular cell E, F and G in Figure 3 has a separate entrance pipe, respectively, 156, 154 and 164, and each has a separate overflow. Similarly, in Figure 2, each particular cell has a separate entrance pipe, thus providing for a quiet inflow of liquid into each tank and a minimum of disturbance as the affluent enters.

The object in settling is to produce a sludge which has from 50% to 65% solids. In Figure 2 the material will leave the accumulating sludge tank 80 with 10% to 15% solids and after transfer and thickening in the main tank 20 the material can be removed at 34 within this desired range of solids as above stated from 50% to 65%. In Figure 3, the material will leave the bottom separator tanks 182 and enter the main tank C—D with about 1% to 10% solids; and there it will be thickened to the desired percentage. The main tank, of course, in addition to being a settling and thickening tank can also serve as a storage tank, the level of the thickened material moving upward if greater quantities are stored in the central tank.

In Figure 2 reference has been made to the agitator 32 which can be driven through a V-belt drive 220. This agitator moves slowly in the bottom of the main tank 20 to keep the thickened sludge flowing to the outlet. The construction is relatively simple; and in view of the fact that sludge is being fed into this area from the supplemental settling tanks, there is enough fluid in the sludge to prevent blocking of the agitator, which keeps the heavier solids in suspension and causes them to flow by gravity to the outlet.

Should any inside repairs be required in tank 20, it is then possible to use tank 80 as a thickening tank and the main tank 20 can then be drained without shutting down the entire apparatus.

I claim:

1. A method of removing liquid suspended particles from a liquid and thickening the resulting material, which comprises introducing the liquid-suspended particles into a main tank at a relatively low rate of speed to permit gravity separation of the larger suspended particles into the bottom portion of said main tank, overflowing the liquid from said main tank with smaller suspended particles to a plurality of annular troughs, vertically and horizontally multiplied for downward flow of particles from one to the other while permitting upward flow of liquid to an overflow, transferring the smaller particles from the bottom of said annular trough to the bottom of said main tank for a thickening operation and subsequently removing the thickened sludge from the bottom of said main tank.

2. The method of removing liquid-suspended particles from a liquid which comprises introducing the combination into a main tank for gravity separation of the larger suspended particles and overflowing the liquid from said main tank to a plurality of annular troughs vertically and horizontally multiplied for downward flow of particles from one to the other while permitting upward flow of liquid to an overflow.

3. A unit for the recovery of liquid-suspended particles which comprises a main separation chamber having a relatively large inlet tube opening approximately one-half the distance down said chamber in a downward direction, a plurality of horizontally spaced separator troughs, and means connecting an overflow tube in said main chamber to said individual separator troughs, and additional means associated with the bottom of said main chamber wherein settled particles from said trough may be passed to the bottom of said main chamber.

4. A device as defined in claim 3 in which the overflow from said main chamber is passed to a plurality of vertically and horizontally spaced individual separator troughs, each having spaced discharge tubes leading downwardly into vertically subjacent troughs and a plurality of collector tubes wherein settled particles from the lowermost of said troughs may be passed to the bottom of said main chamber for thickening.

5. A unit for the recovery of liquid suspended particles which comprises a main separation chamber having a relatively large inlet approximately at the vertical center of said chamber and directed downwardly, and a plurality of horizontally and vertically spaced annular separator troughs surrounding said main chamber, each vertical tier of troughs being associated with said main tank by separator pipes leading to said troughs, and the upper of said vertical tiers of troughs being provided with multiple discharge tubes leading to the subjacent tier of troughs, a plurality of collector tubes from the lowermost tier of troughs adapted to pass collected particles to the bottom of said main chamber, and means confining all of said troughs wherein overflow from said respective tiers may pass upwardly to a common overflow for said unit.

6. A unit for the recovery of liquid suspended particles which comprises as main separation chamber having a relatively large inlet approximately at the vertical center of said chamber and directed downwardly, and a plurality of horizontally spaced, concentric, annular troughs surrounding said main chamber, each trough receiving overflow from said main chamber of liquid and smaller suspended particles, an intermediate settling tank between said main chamber and said troughs and a plurality of collector tubes from said troughs connected to said settling tank, and means for transferring settled material from said intermediate settler tank to the bottom of said main chamber.

7. A unit for the recovery of liquid suspended particles which comprises a main separation chamber having a relatively large inlet approximately at the vertical center of said chamber and directed downwardly, and a plurality of horizontally spaced, concentric, annular troughs surrounding said main chamber, each trough receiving overflow from said main chamber of liquid and smaller suspended particles, an intermediate settling tank between said main chamber and said troughs and a plurality of collector tubes from said troughs connected to said settling tank, means for transferring settled material from said intermediate settler tank to the bottom of said main chamber, and a revolving agitator in the bottom of said main separation chamber for maintaining particles in suspension at the bottom of said container and directing the same to an outlet in said main container.

8. A unit for the recovery of liquid suspended particles which comprises a main separation chamber having a relatively large inlet approximately at the vertical center of said chamber and directed downwardly, and a plurality of horizontally spaced, concentric, annular troughs surrounding said main chamber, each trough receiving overflow from said main chamber of liquid and smaller suspended particles, a plurality of collector tubes leading from said troughs, an intermediate thickening tank and regulator between said main chamber and said troughs to receive material from said collector tubes to effect additional thickening and settling, said tank having the final overflow for affluent from the entire device, and means for transferring thickened material from said intermediate tank to the bottom of said main chamber.

References Cited in the file of this patent

UNITED STATES PATENTS

| | | |
|---|---|---|
| 397,585 | Coplen | Feb. 12, 1889 |
| 1,160,918 | Linden | Nov. 16, 1915 |
| 2,110,462 | Coberly | Mar. 8, 1938 |
| 2,289,112 | Fischer | July 7, 1942 |